Feb. 25, 1964 THOMAS KEITH GLENNAN 3,122,098
ADMINISTRATOR OF THE NATIONAL
AERONAUTICS AND SPACE
ADMINISTRATION
APPARATUS AND METHOD FOR CONTROL OF A SOLID
FUELED ROCKET VEHICLE
Filed Nov. 25, 1960
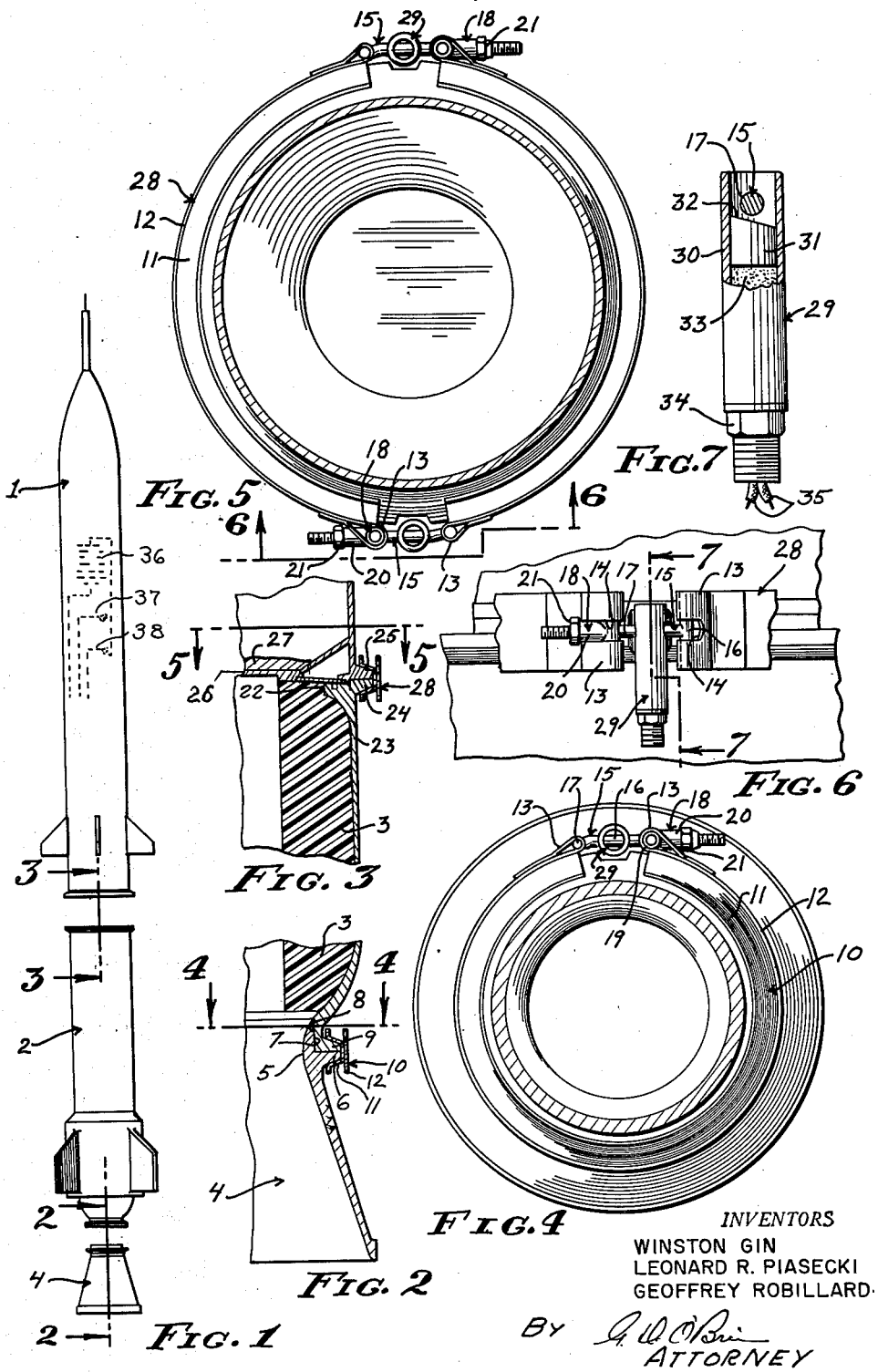
INVENTORS
WINSTON GIN
LEONARD R. PIASECKI
GEOFFREY ROBILLARD
BY *G. W. O'Brien*
ATTORNEY United States Patent Office 3,122,098
Patented Feb. 25, 1964

3,122,098
APPARATUS AND METHOD FOR CONTROL OF A SOLID FUELED ROCKET VEHICLE
Thomas Keith Glennan, Administrator of the National Aeronautics and Space Administration, with respect to an invention of Winston Gin, Leonard R. Piasecki, and Geoffrey Robillard
Filed Nov. 25, 1960, Ser. No. 180,374
4 Claims. (Cl. 102—49)

This invention relates to apparatus and method for control of solid fueled rocket vehicles, more particularly to terminal control of thrust of such rocket vehicles in order to predetermine the trajectory thereof.

Included in the object of this invention are:

First, to provide an apparatus and method for control of solid fueled rocket vehicles wherein accurate and predetermined reduction and termination of thrust may be effected from a remote station so as to effect vernier adjustment of range and velocity of the rocket vehicle.

Second, to provide an apparatus and method for control of solid fueled rocket vehicles wherein reduction and termination of thrust is effected without producing transient thrust peaks, or producing side thrusts.

Third, to provide an apparatus and method for control of solid fueled rocket vehicles which takes place in two stages wherein first, the nozzle is separated on command from the rocket motor chamber to reduce chamber pressure and hence thrust and second, the motor chamber itself is separated on command from the remaining components of the rocket vehicle and thereupon caused to decelerate.

With the above and other objects in view as may appear hereinafter, reference is directed to the accompanying drawings, in which:

FIGURE 1 is a reduced substantially diagrammatical view showing the payload, motor, and nozzle structures of a rocket vehicle, with the connecting bands removed and the structures shown separated.

FIGURE 2 is an enlarged fragmentary longitudinal sectional view taken through 2—2 of FIG. 1 showing the motor and nozzle sections joined by a connecting band.

FIGURE 3 is a similar enlarged fragmentary longitudinal sectional view taken through 3—3 of FIG. 1 showing the motor and payload structures joined by a connecting band.

FIGURE 4 is a transverse sectional view taken through 4—4 of FIG. 2 showing the connecting band in position.

FIGURE 5 is a similar transverse sectional view taken through 5—5 of FIG. 3.

FIGURE 6 is a fragmentary elevational view of the motor and payload structures and the connecting band, the view being taken from 6—6 of FIG. 5.

FIGURE 7 is an enlarged, partially sectional, partially elevational view taken through 7—7 of FIG. 6 showing the severing knife and its remotely actuated operating charge.

A rocket vehicle adapted to this invention includes a payload structure 1, a motor structure 2 containing a solid propellant 3, and a nozzle structure 4.

The nozzle structure is in the form of a truncated cone tapering forwardly to form a throat 5. At the throat end, the nozzle structure is provided with an external flange 6 having sloping or beveled face at its rearward side and planar at its forward side. The flange is preferably located rearwardly of the forward extremity of the throat, which forms a forwardly projecting rim 7.

The motor structure is in the form of a cylindrical tube into which has been cast a conventional solid propellant 3 having a central bore of conventional cross section. Conventional ignition means, not shown, are provided. The rearward end of the motor structure is constricted to form a throat 8 fitting around the rim 7 and terminating in a flange 9 which mates with the flange 6. The forward face of the flange 9 slopes rearwardly so that the distal faces of the flanges converge radially outwardly. The internal diameter of the throat 8 bears a preselected ratio to the diameter of the nozzle throat 5 as will be brought out hereinafter.

The flanges 6 and 9 are held together by a band assembly 10. The band assembly includes inner band member 11 of channel shaped cross section having radially inwardly diverging side walls terminating in oppositely directed reinforcing lips. The inner band member fits over the flanges 6 and 9 and clamps the flanges axially as the band is constricted. The radially outer portion of the inner band joining the diverging walls is in the form of a cylindrical web. Secured to the web by spotwelds or other means is an outer band 12 which is cylindrical.

The inner and outer bands are split at one or more points, depending upon the diameter of the juncture between the motor and nozzle structures. It is not essential that the outer band be coextensive with the inner band; instead, short segments adjacent the split extremities of the inner band may be substituted. At each split extremity of the inner band, the outer band, or band segments is doubled upon itself to form a loop 13 which is provided with a transverse slot 14.

The loops 13 are joined by a T-bolt 15 having a cross member 16 journalled in one of the loops 13, and a shank 17 extending through the slots 14 of the two loops. The other loop receives a tubular T-shaped element 18 having a cross or journal portion 19 fitting the remaining loop 13 and a tubular sleeve portion 20 adapted to fit slidably on the shank 17. The shank protrudes through the sleeve portion 20 and its protruding extremity is screwthreaded to receive a nut 21. When the nut is drawn tight, the inner band member 11 is tightened on the flanges 6 and 9 and securely holds the motor and nozzle structures together.

The forward end of the motor structure 2 is internally constricted to form a forward throat 22, the diameter of which bears a preselected ratio to the diameters of the nozzle throat 5 of the nozzle structure and rearward throat 8 of the motor structure. Externally the motor structure is provided with a forwardly continuing skirt 23 surrounding the throat 22 and terminating in an external flange 24 which confronts a corresponding external flange 25 at the rearward end of the payload structure 1. The rearward end of the payload structure is provided with a portion 26 including a central heat resistant pad 27 covering and sealing the throat 22.

The confronting flanges 24 and 25, except for greater diameter, are identical to the mating flanges 6 and 9, and have radially outwardly converging faces which receive a second band assembly 28, the elements of which may be identical, except for diameter, to the elements of the band assembly 10 and are similarly identified. For purposes of illustration, the band assembly 28 is shown as split diametrically.

Fitted on each of the shanks 17 of the T-bolts 15 of the two band assemblies is a remotely actuated severing device 29. Each severing device includes a tubular shell 30 having a transverse hole which receives the shank 17 of a T-bolt. Within the shell 30 is a cylinder 31 having a shearing edge 32 adapted, when forced against the shank 17, to sever the shank. At the opposite side of the cylinder 31 from the shank 17, the sleeve is provided with a propellant charge 33 capable of generating sufficient force to shear the shank 17. The end of the sleeve remote from the shank is provided with a cap 34 through which pass ignition wires 35. A suitable electrical igniter, not shown, is incorporated in the propellant charge 33.

It is customary to provide in rocket vehicles a power source to operate the various devices contained in the payload structure, and to provide control means subject to remote command. Such conventional means is represented diagrammatically as a battery 36 and switches 37 and 38 for independent control of the severing devices associated respectively with the band assemblies 10 and 23.

The practice of the method for controlling a rocket vehicle utilizing the apparatus hereinbefore described, is as follows:

Initially the payload, motor and nozzle structure are secured in series by the clamp assemblies 10 and 23. After firing, and before burnout, and also before it is determined that thrust should be completely terminated, the severing device connected with the clamp band assembly 10 is actuated by remote command. The clamp band assembly immediately spreads radially, freeing the nozzle structure 4 from the motor structure 2. As a consequence, the effective throat area changes from the area of the throat 5 to the area of the throat 8 of the motor structure 2, causing, when equilibrium is re-established, a corresponding reduction in thrust.

The rocket vehicle is permitted to continue at reduced thrust for vernier control of its course; then at the appropriate time severing devices connected with the clamp band 23 are actuated by remote command. The net thrust, due to the opposite open ends of the motor structure, is for an instant, zero; however, on establishing of equilibrium by reason of flow from the forward throat 22, there is produced a net forward thrust decelerating the motor structure. This has the effect of accelerating the motor structure away from the payload structure.

That the conditions of partial thrust, then termination of thrust may be, in fact, attained, the following analysis is pertinent:

It is well established in rocket motor design that the net force acting on a rocket motor is the thrust imparted to the vehicle that is being propelled. This force may be expressed as:

(1) $$F = \int_S p\, dS = \int_{S_o} p_o\, dS_o + \int_{S_i} p_i\, dS_i$$

where:

F: thrust
p: local pressure
$p_i$: inside pressure
$p_o$: external pressure
S: surface area
$S_i$: inside surface area
$S_o$: outside surface area If the thrust coefficient is defined as the ratio of thrust to the product of chamber pressure and throat area, it is established that:

(2) $$C_{F_1} = \frac{A_c}{A_5} - \frac{p_o}{p_c}\epsilon_0 - \int_1^{A_c/A_5} \frac{p}{p_c}\epsilon d + \int_1^{\epsilon_0} \frac{p}{p_c} d\epsilon$$

where:

$A_5$: cross sectional area of the throat 5
$A_c$: cross sectional area of the motor chamber structure
$A_e$: cross sectional area at discharge end of the nozzle structure 4
$C_F$: thrust coefficient
$\epsilon$: expansion ratio $\epsilon_0 : \frac{A_e}{A_5}$ $p_c$: chamber pressure At the instant that the nozzle structure is separated, the throat 8 (having a cross-sectional area $A_8$) becomes effective, and the thrust produced is:

(3) $$F_2 = C_{F_2} p_c A_8$$

where (4) $$C_{F_2} = \frac{A_c}{A_8} - \frac{p_o}{p_c} - \frac{A_5}{A_8}\left[\int_1^{A_c/A_5}\frac{p}{p_c}d\epsilon - \int_1^{A_8/A_5}\frac{p}{p_c}d\epsilon\right]$$

To achieve the desired condition in which instantaneously, there is no change in thrust it is necessary that:

(5) $$C_{F_1} A_5 = C_{F_2} A_8$$

Thus it is possible to solve for $C_{F_2}$ and $A_8$ between the last two equations, since all the other parameters are known for a given operating condition.

In general, $C_{F_2}$ will not remain at the value given by the above equation, but sonic conditions will soon be established at the new throat area. $C_{F_2}$ will start at some value greater than unity and increase to about 1.25 (depending on the specific heat ratio of the gases) when local sonic conditions are reached. The chamber pressure will adjust to a lower level determined by $A_8$ and hence a lowered sustaining level of thrust is now available for vernier operation. At a desired time, the thrust may be cancelled by the next step of separating the motor structure from the payload structure.

In determining the separation plane at the forward end, the following considerations must be made. Because, prior to separation, there is no flow in the hemispherical forward end of the motor structure 2, the momentary thrust coefficient due to partition at the forward end is unity. There, the instantaneous reverse thrust is:

(6) $$p_c A_{22}$$

To cancel the forward thrust, it is required that:

(7) $$C_{F_2} p_c A_8 = p_c A_{22}$$

where $A_{22}$: the area of throat 22

Since the equilibrium value of $C_{F_2}$ is 1.25 approximately, it follows that:

(8) $$A_{22} = 1.25 A_8$$

The net thrust for an instant is thus zero, but local sonic velocity soon occurs at the forward end of the motor structure 2. Since the forward end throat 22 is larger than the aft end throat 8, the rearward thrust is greater and thus the motor structure will decelerate. Or, stated otherwise, it will accelerate away from the payload structure 1.

It will be observed that if the combustion stops at this stage and if later the propellant should reignite, there is no influence on the separated payload structure 1.

It will be apparent from the above description that many modifications are possible in the light of the above teaching. It is, therefore, to be understood that within the scope of the appended claims the invention may be practiced otherwise than as specifically described herein.

We claim:

1. A rocket vehicle comprising: means defining a rocket motor chamber containing a solid propellant; a first throat of smaller area, a second throat of intermediate area, and a third throat of larger area, the first and second throat communicating with and directed rearwardly from said rocket motor chamber, the third throat also communicating with said rocket motor chamber and directed forwardly therefrom; said first, second, and third throats being operable in sequence to impart respectively an initial major forward thrust, a subsequent minor forward thrust, and a final rearward thrust to said rocket motor.

2. A rocket vehicle comprising: means defining a rocket motor chamber containing a solid propellant; a first throat of smaller area, a second throat of intermediate area, and a third throat of larger area, the first and second throat communicating with and directed rearwardly from said rocket motor chamber, the third throat also communicating with said rocket motor chamber and directed forwardly therefrom; said first throat being operable to impart an initial forward thrust to said rocket motor; a first remote command means for terminating operating of said first throat and causing operation of said second throat, said second throat being operable to impart a minor forward thrust to said rocket motor; and a second remote command means for causing operation of said third throat to cancel the said minor forward thrust and produce a rearward thrust to said rocket motor.

3. A rocket vehicle, comprising: a payload structure; a rocket motor structure; a nozzle structure; a first and second remote command means connecting respectively said nozzle structure to said motor structure, and said motor structure to said payload structure; a minor throat formed in said nozzle structure; an intermediate throat formed in the rearward end of said motor structure adjacent said nozzle structure; and a major throat formed in the forward end of said motor structure and initially covered by said payload structure; said minor throat being operative to produce an initial forward thrust to said structures; said first and second remote control means being operable in sequence to cause operation of said intermediate and major throats; thereby to produce in sequence a reduced forward thrust to said payload and rocket motor structures and a final rearward thrust to said motor structure.

4. A rocket vehicle structure, comprising: a rocket motor chamber structure containing a solid propellant; a first nozzle means for said motor chamber structure to produce a major initial forward thrust; a second nozzle means for said motor chamber structure to produce a minor forward thrust; means responsive to remote command to inactivate said first nozzle means and activate said second nozzle means; a third nozzle means for said motor chamber structure to produce a rearward thrust on said motor chamber structure thereby to effect deceleration thereof; a payload structure initially connected to said motor chamber structure; and means responsive to remote command for disconnecting said motor chamber structure from said payload structure prior to activation of said third nozzle means.

References Cited in the file of this patent

UNITED STATES PATENTS

| | | |
|---|---|---|
| 2,596,644 | Bradford et al. | May 13, 1952 |
| 2,655,105 | Hansche | Oct. 13, 1953 |
| 2,809,584 | Smith | Oct. 15, 1957 |
| 2,952,972 | Kimmel et al. | Sept. 20, 1960 |
| 2,959,129 | Warren | Nov. 8, 1960 |
| 2,996,316 | Terhume | Aug. 15, 1961 |
| 3,029,734 | Allenson | Apr. 17, 1962 |
| 3,032,356 | Botsford | May 1, 1962 |
| 3,040,517 | Ryden et al. | June 26, 1962 |